July 20, 1965 C. D. NEUENSCHWANDER 3,195,899
MATERIAL CONVEYING AND SCATTERING IMPLEMENT
Filed Dec. 17, 1963 9 Sheets-Sheet 1

INVENTOR.
Charles D. Neuenschwander,
BY Hood, Gust & Irish
Attorneys.

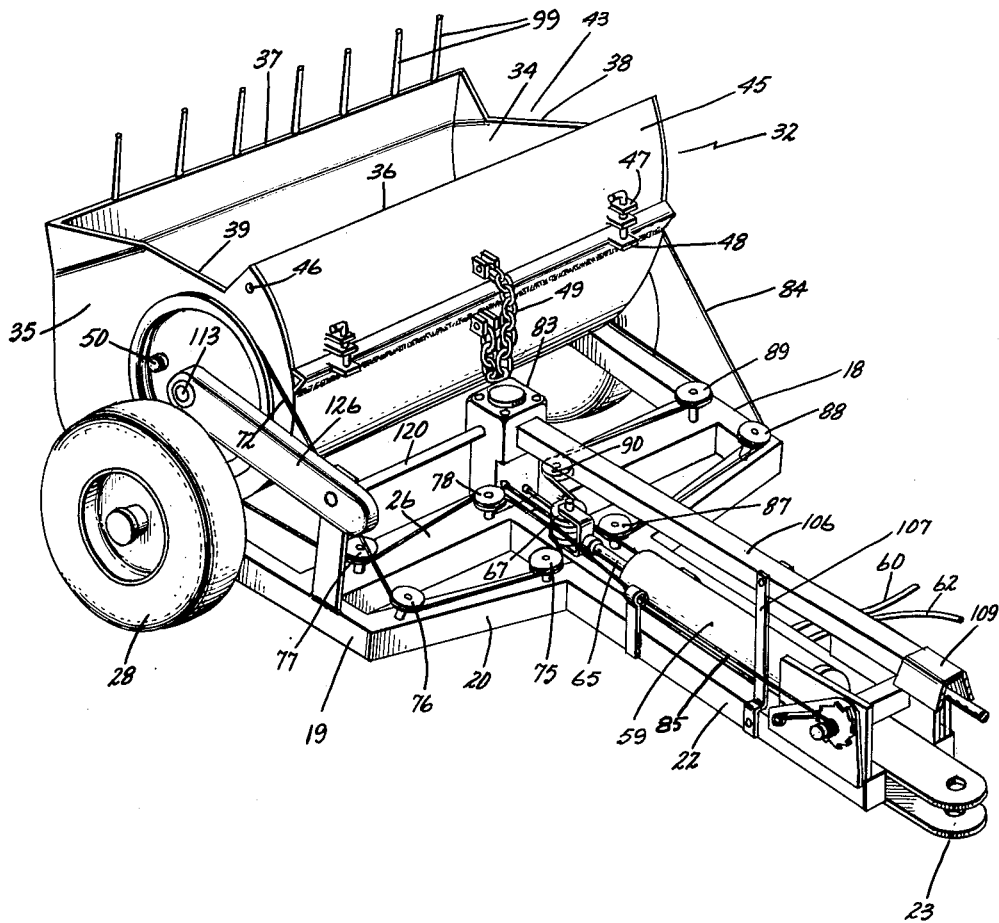

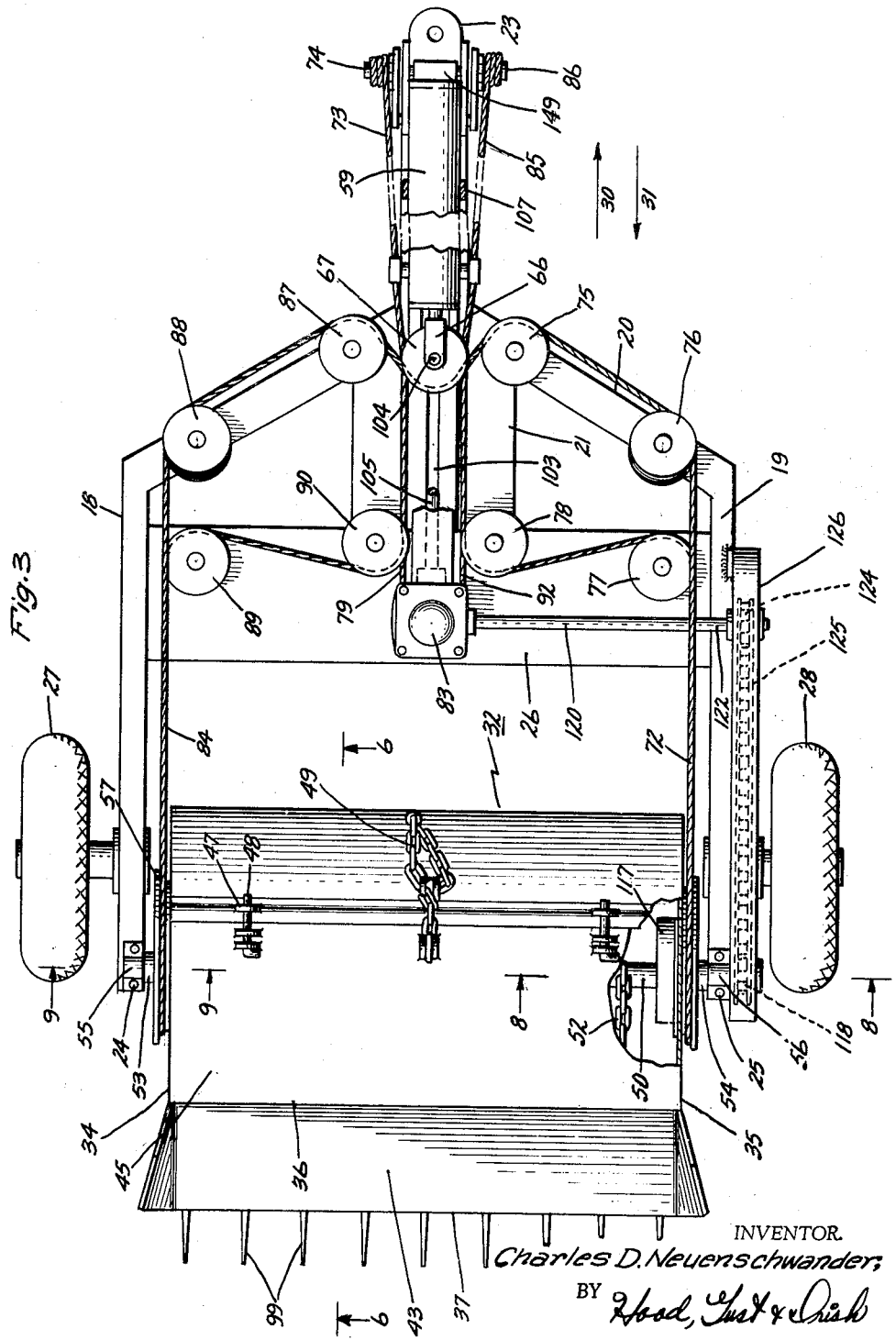

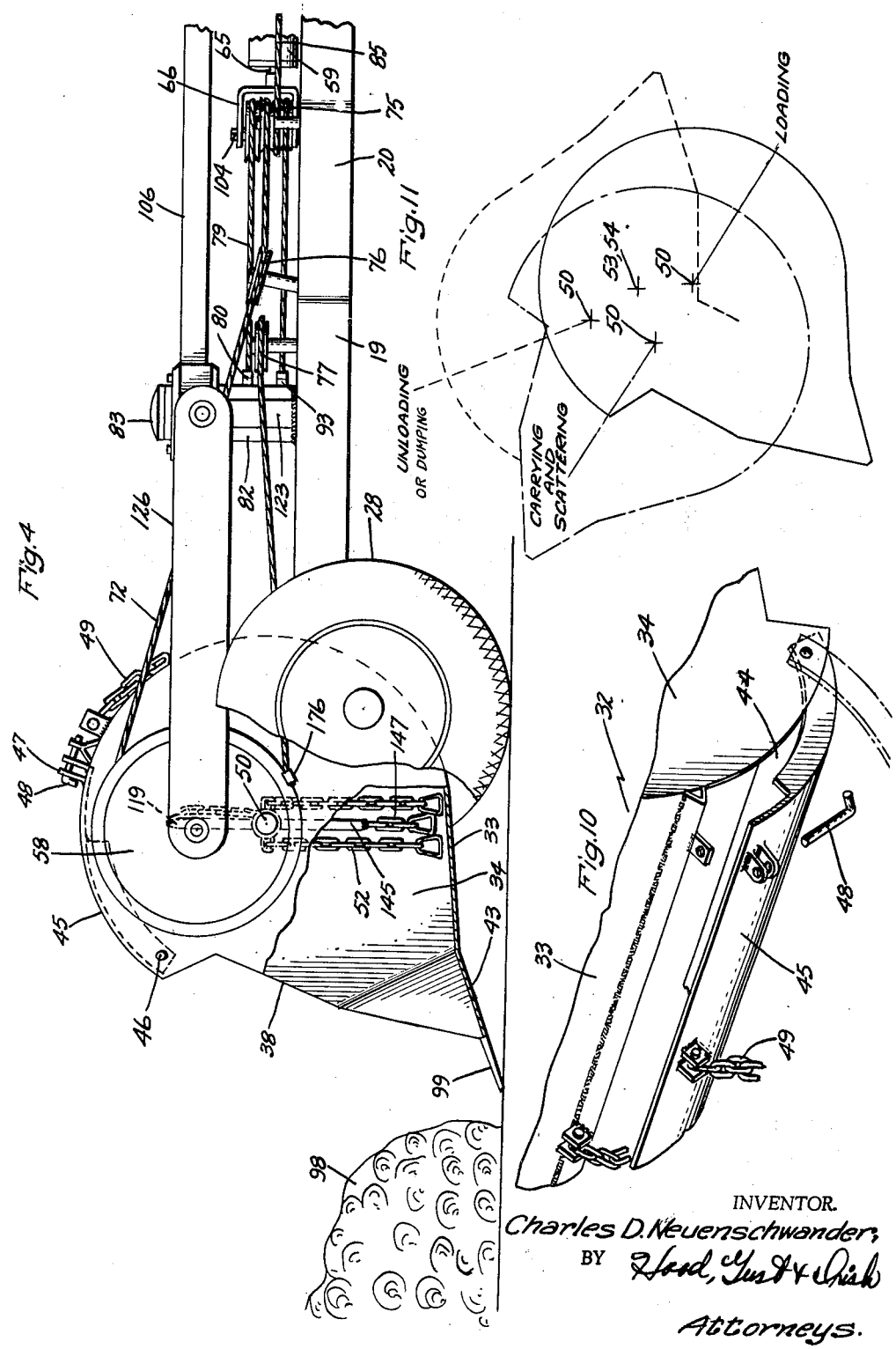

July 20, 1965
C. D. NEUENSCHWANDER
3,195,899
MATERIAL CONVEYING AND SCATTERING IMPLEMENT
Filed Dec. 17, 1963
9 Sheets-Sheet 5
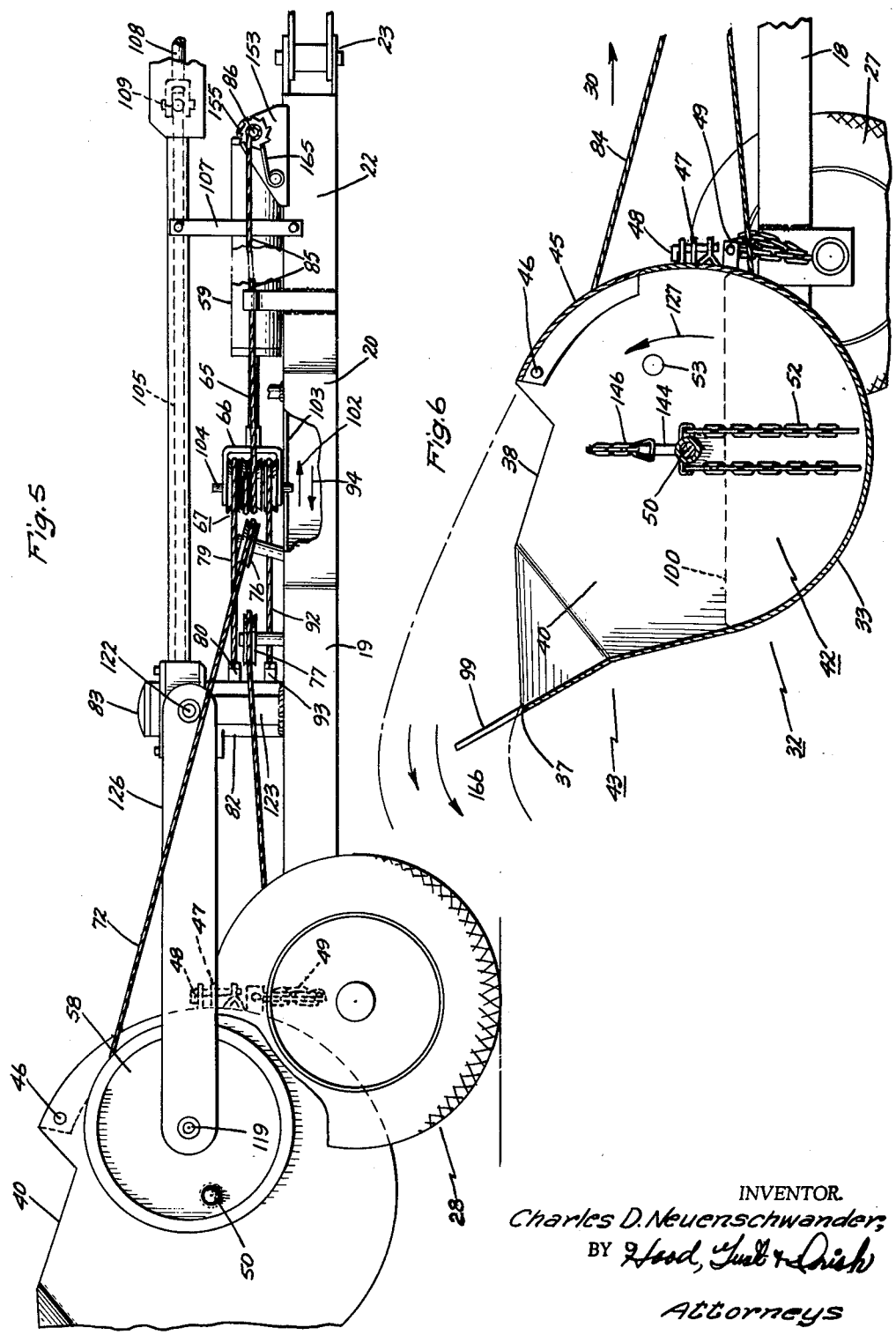
INVENTOR.
Charles D. Neuenschwander,
BY Hood, Just & Irish
Attorneys

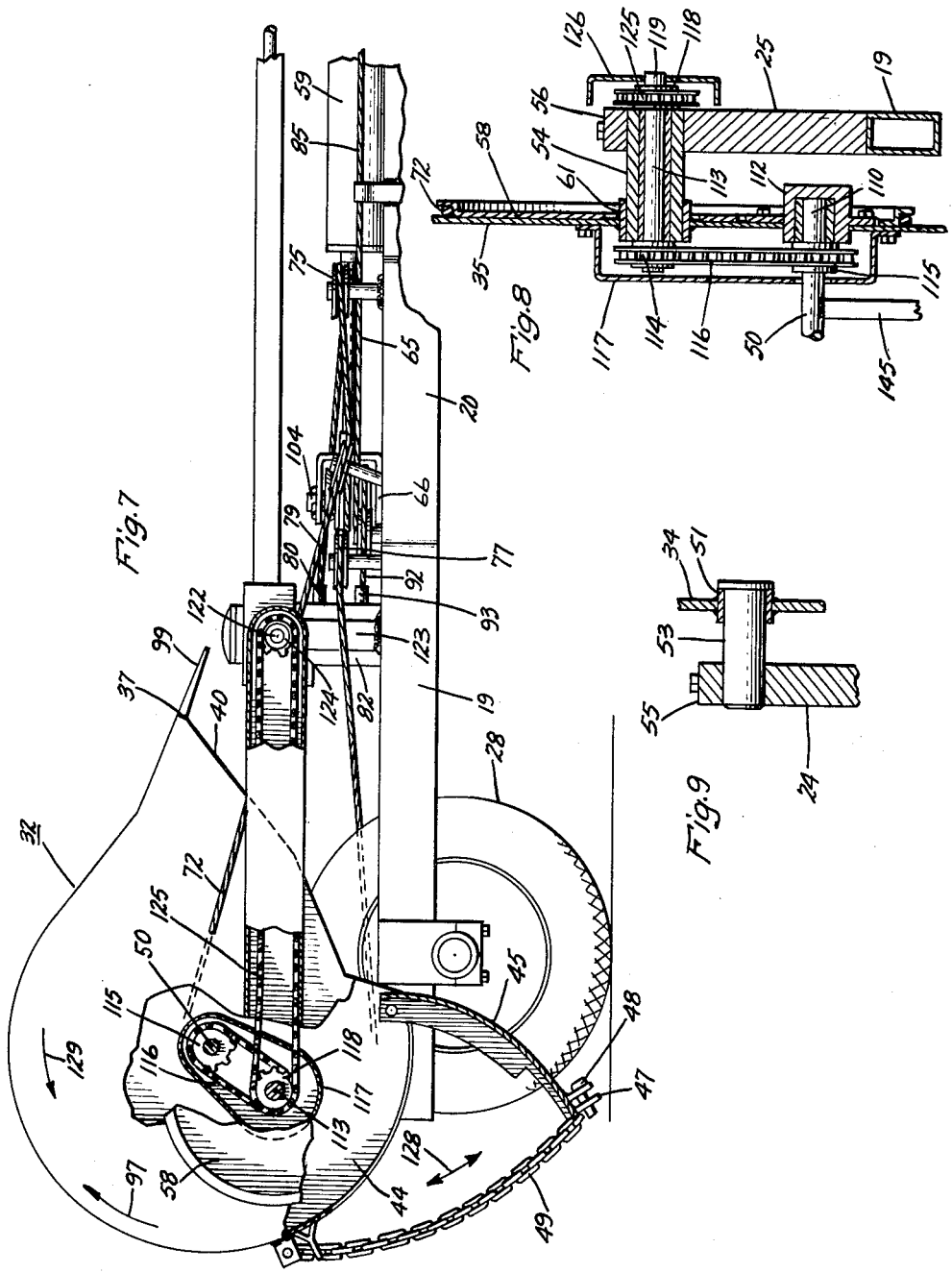

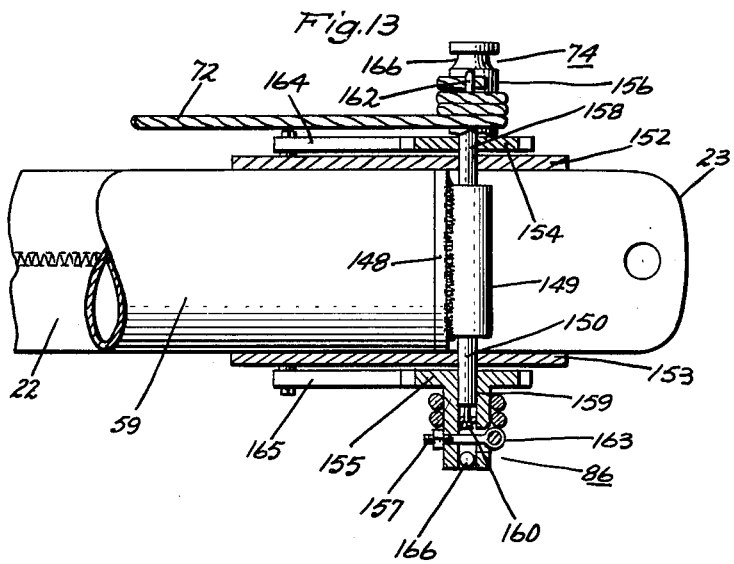

July 20, 1965   C. D. NEUENSCHWANDER   3,195,899
MATERIAL CONVEYING AND SCATTERING IMPLEMENT
Filed Dec. 17, 1963   9 Sheets-Sheet 8

INVENTOR.
Charles D. Neuenschwander,
BY Hood, Gust & Irish
Attorneys.

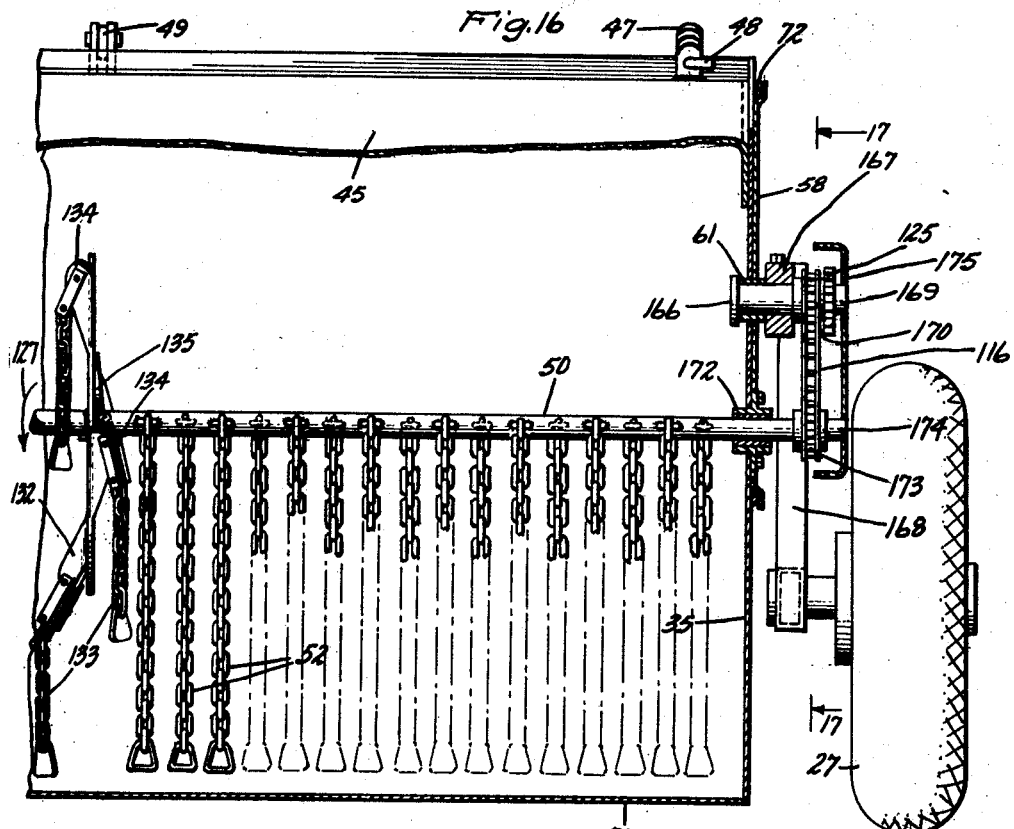
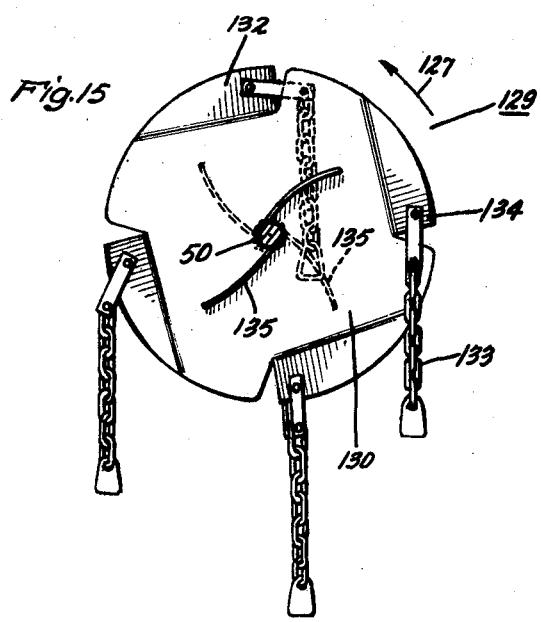
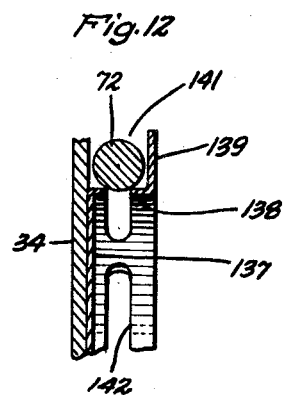

United States Patent Office 3,195,899
Patented July 20, 1965

3,195,899
MATERIAL CONVEYING AND SCATTERING
IMPLEMENT
Charles D. Neuenschwander, R.R. 4, Bluffton, Ind.
Filed Dec. 17, 1963, Ser. No. 331,203
11 Claims. (Cl. 275—3)

This invention relates generally to farm implements for conveying and scattering material, and more particularly to manure spreaders.

Conventional material conveying and scattering implements comprise a wheel-supported open body or container having means therein for scattering or spreading the material onto the ground as the implement is moved thereover. All such conventional material conveying and scattering implements known to the present applicant have required that the material initially be deposited or loaded therein from the top thus requiring the use of auxiliary loading apparatus such as overhead conveyors, special installations permitting the implement to be driven under a loading station, or a laborious and time consuming hand shovelling operation. It is therefore desirable to provide a self-loading material conveying and scattering implement adapted to pick up a quantity of material deposited in a pile upon the ground and thereafter to convey the material to the desired scattering location. It is further desirable that such a self-loading material conveying and scattering implement be adapted for one-man operation with a conventional farm tractor. It is further desirable that such an implement incorporate material scattering means of the flail type, that it be of simple and rugged construction, and that it be easily maintained by unskilled labor.

It is accordingly an object of the invention to provide an improved material conveying and scattering implement.

Another object of the invention is to provide a self-loading material conveying and scattering implement.

A further object of the invention is to provide an improved material conveying and scattering implement of the flail type.

Further objects and advantages of the invention will become apparent by reference to the following description and the accompanying drawing, and the features of novelty which characterize the invention will be pointed out with particularity in the claims annexed to and forming a part of this specification.

The invention in its broader aspects provides a self-loading material conveying and scattering implement comprising mobile frame means for supporting the implement upon the ground for movement in forward and reverse directions. A material container is provided having side wall means joined to opposite end walls, the side wall means having an opening formed therein. Means are provided for mounting the container on the frame means for tilting movement between first and second positions about an axis transverse to the direction of movement of the implement, the container in its first position having its side wall opening facing generally rearwardly with an edge of the side wall means being adjacent the ground so as to act as a scoop for loading material through the opening into the container when the implement is moved rearwardly. When the container is in its second position, the side wall opening faces generally upwardly so that the scooped material may be conveyed in the container by forward movement of the implement. Means are provided in the container, such as rotatable flail elements, for scattering material in the container outwardly through the side wall opening.

In the drawing:

FIG. 2 is a view in perspective showing the implement of the invention viewed from the front and showing the container in the conveying and scattering position;

FIG. 3 is a top view of the implement of the invention, partly broken away, showing the container in its loading position;

FIG. 4 is a side view, partly broken away, showing the container in its loading position;

FIG. 5 is a side view, partly broken away, showing the container in its conveying and scattering position;

FIG. 6 is a fragmentary cross-sectional view, taken generally along the line 6—6 of FIG. 3, but showing the container in its conveying and scattering position;

FIG. 7 is a side view, partly broken away, showing the implement with the container in its dumping position;

FIG. 8 is a fragmentary cross-sectional view taken along the line 8—8 of FIG. 3;

FIG. 9 is a fragmentary cross-sectional view taken along the line 9—9 of FIG. 3;

FIG. 10 is a fragmentary view in perspective showing the unloading door with the container in its unloading position;

FIG. 11 is a diagrammatic view illustrating the several positions of the container;

FIG. 12 is a fragmentary cross-sectional view showing a feature shown in FIG. 8 in greater detail;

FIG. 13 is a fragmentary view, partly in cross-section and partly broken away showing the cable anchor and tightening mechanism;

FIG. 15 is a side view showing a preferred form of load starting device;

FIG. 16 is a fragmentary cross-sectional view showing the load starting device of FIG. 15 assembled in the implement and also showing a modified form of flail drive; and FIG. 17 is a fragmentary cross-sectional view taken generally along the line 17—17 of FIG. 16.

Figure 1:
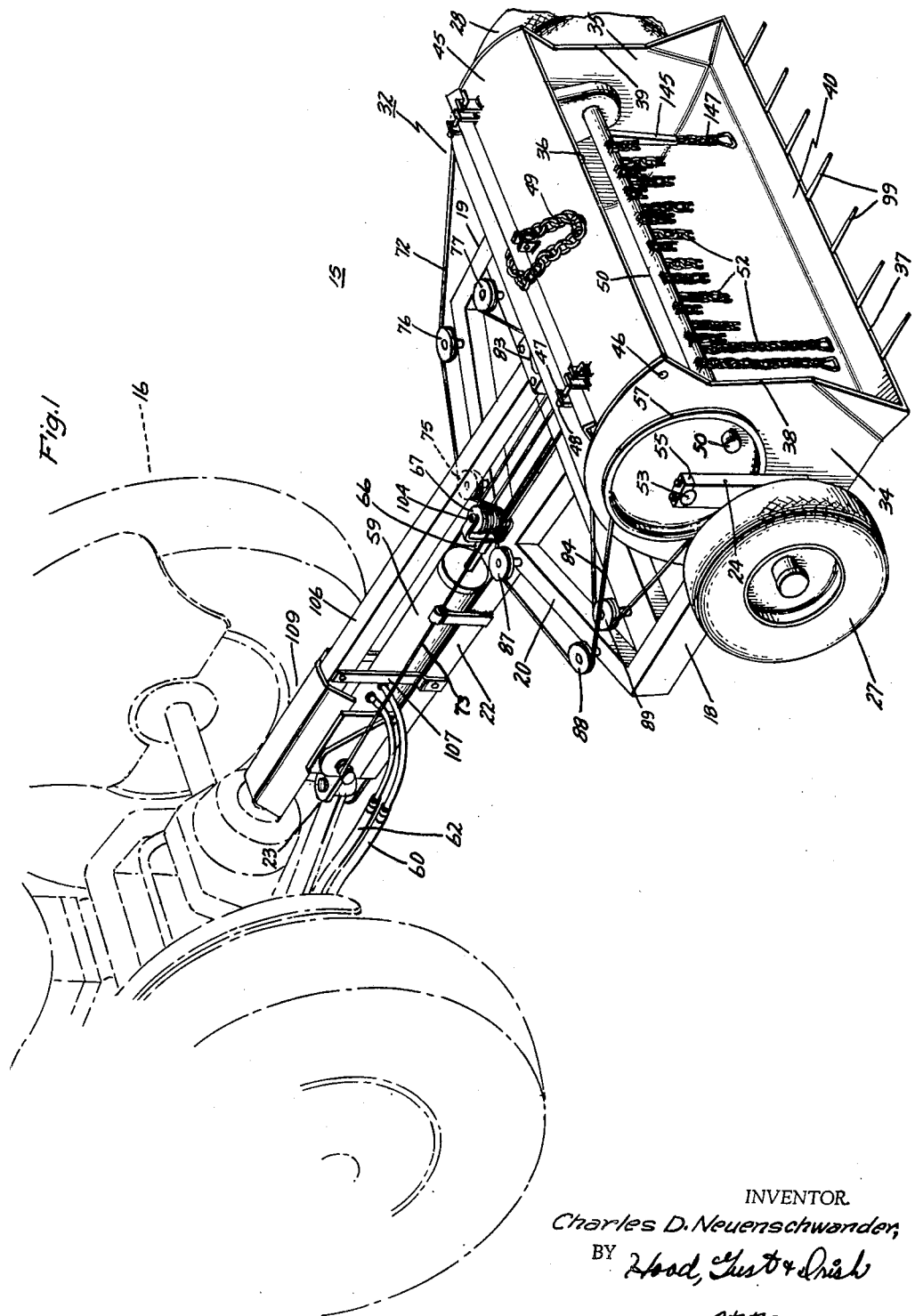
FIG. 1 is a view in perspective of the self-loading material conveying and scattering implement of the invention viewed from the rear and showing the container in the loading position.

Referring now to FIGS. 1 through 14 of the drawing, the self-loading material conveying and scattering implement of the invention generally indicated at 15, is adapted to be towed and maneuvered by by conventional farm tractor, indicated in dashed lines at 16 in FIG. 1, and to be actuated and operated from the conventional hydraulic system and power take-off of the tractor as will be hereinafter more fully described.

The implement 15 comprises a main frame 17 having a generally U-shaped section formed of longitudinally extending, transversely spaced, parallel leg elements 18 and 19 joined at their forward ends by connecting element 20. A tongue element 22 is joined to connecting element 20 and extends forwardly therefrom, tongue element 22 having a conventional hitch 23 (FIG. 5) formed at its forward end for removably connecting the tongue 22 to the draw-bar of the tractor 16. Upstanding support elements 24 and 25 extend upwardly from leg elements 18, 19 of frame 17, adjacent their rear ends. Frame element 26 extends transversely between leg elements 18 and 19 and is joined to connecting element 20 by center element 21, as best seen in FIG. 3. It will be readily understood that frame elements 18, 19, 20, 21, 22, 24, 25 and 26 are preferably formed of conventional steel structural shapes suitably welded together to form the unitary frame assembly 17.

Suitable rubber-tired wheels 27, 28 are rotatably mounted on the outer sides of leg elements 18, 19 of frame 17 in any conventional manner and support the implement upon the ground for movement in forward and reverse directions as shown by arrows 30 and 31 in FIG. 3.

A container 32 is provided fabricated from suitable sheet metal and having a side wall 33 joined to opposite end walls 34 and 35. Side wall 33 has spaced edges 36 and 37 which with edges 38 and 39 of the end walls 34, 35 define an opening 40 in the side wall of the container 32 extending transversely between the end walls 34, 35. As best seen in FIG. 6 container 32 may be said to comprise a body portion 42 and a scoop portion 43, the body portion 42 being open at one side, as at 40, and having a generally semicircurlar cross-section, the scoop portion 43 having side and end walls respectively integrally joined to side wall 33 and end walls 34, 35 and communicating with opening 40 of the body portion 42.

As best seen in FIG. 7, another opening 44 is provided in side wall 33 of container 32 adjacent edge 36, extending between end walls 34, 35, and communicating with the interior of body portion 42. Opening 44 is normally closed by a suitable door 45 pivotally connected to end walls 34, 35 at as 46 and when in the closed position forms a part of the side wall 33. Door 45 is normally held in its closed position by means of latches, 47 with cooperating pins 48, and its pivotal movement is limited by means of a suitable chain 49.

A shaft 50 has its opposite ends respectively journaled in suitable bearings 112 in end walls 34, 35 and extends across container 32 on an axis preferably approximately coincident with the major axis of the semi-circular body portion 42. A plurality of flexible flail elements 52, shown here as being chains, are secured to shaft 50 at spaced intervals therealong, flails 52 normally hanging downwardly from shaft 50. It will be readily seen that rotation of the shaft 50 will cause flails 52 to be rotated and to extend redially outwardly under the influence of centrifugal force thereby to scatter material contained in the body portion 42 of container 32 outwardly through the opening 40.

Load starting bars 144, 145 are respectively secured to flail shaft 50 adjacent its ends, as by welding, and respectively extend in opposite directions. Short chain flail elements 146, 147 are respectively attached to the ends of starting bars 144, 145 and depend therefrom. These load starting bar assemblies 144, 146 and 145, 147 serve to start the scattering operation by initially agitating the load of material in the container; without a load starting device, flails 52 may with certain types of material, tend merely to wrap around the shaft 50 and thus never start the scattering operation.

Referring particularly to FIGS. 8 and 9, a pair of stub shafts 53, 54 are provided for rotatably mounting container 32. Stub shaft 53 is rotatably journaled in a sleeve bearing 51 secured to end wall 34 in any suitable manner, as by welding, and is secured to upstanding frame element 24 by pillow block 55. Stub shaft 54 is likewise rotatably journaled in a sleeve bearing 61 secured to end wall 35, as by welding, and is secured to upstanding frame element 25 by pillow block 56. It will be understood that stub shafts 53, 54 are secured against rotation by pillow blocks 55, 56 and that container 32 is rotatably mounted thereon by means of bearings 51, 61. Thus, container 32 is mounted between frame elements 18, 24 and 19, 25 for rotation about the axis of stub shafts 53, 54 which is transverse with respect to the direction of movement 30, 31 of the implement.

Figure 14:
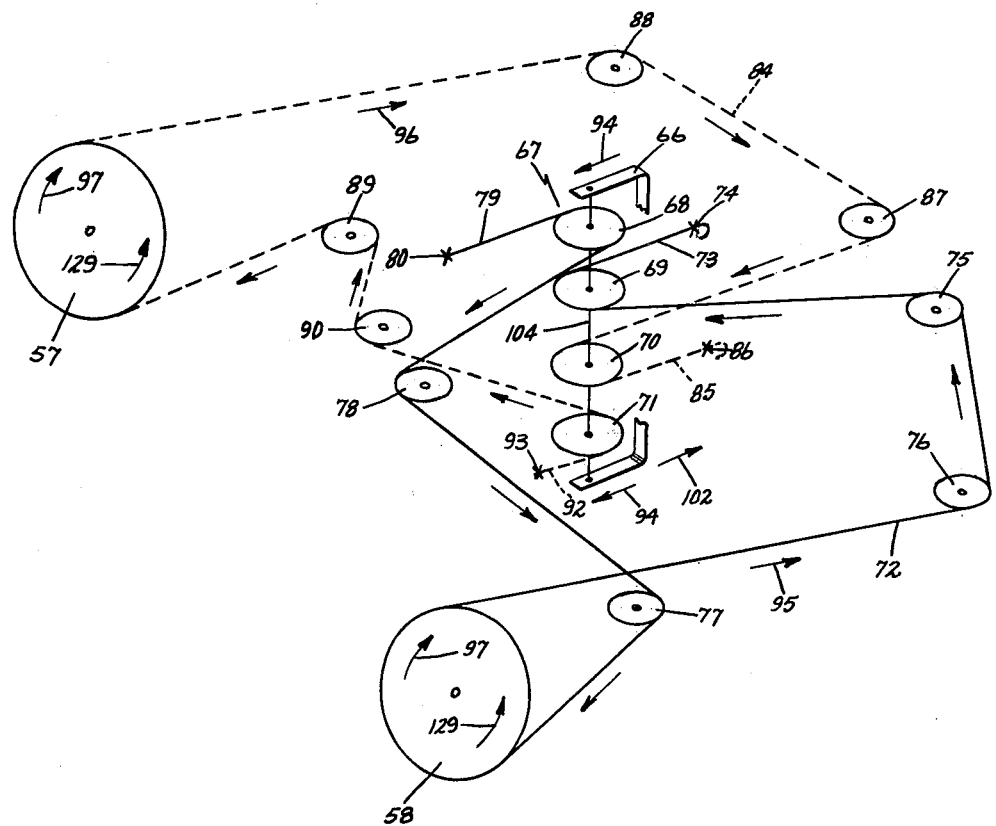
FIG. 14 is a diagram schematically illustrating the cabling employed for rotating the container of the implement of the invention.

In order to rotate container 32 between its several positions as will be hereinafter more fully described, sheaves 57, 58 are secured to the outer surfaces of end walls 34, 35 coaxial with the stub shafts 53, 54. A double-acting hydraulic cylinder 59 is mounted on tongue 22 and has suitable hydraulic lines 60, 62 adapted to be removably connected by suitable fittings 63, 64 (FIG. 5) to the hydraulic system of tractor 16. Cylinder 59 has a piston rod 65 which extends rearwardly toward container 32 and which has a yoke 66 formed on its outer end. Yoke 66 rotatably supports a sheave assembly 67 comprising four (4) individual sheaves 68, 69, 70 and 71 each rotatably mounted on pin 104, as best seen in FIG. 14. Piston rod 65 together with its yoke 66 and sheave assembly 67 is selectively actuable by manipulation of the hydraulic control valves on the tractor (not shown) between a fully retracted position as shown in FIGS. 3 and 4 to a fully extended position as shown in FIG. 7 through an intermediate position as shown in FIG. 5. It will be seen that the lower end of pin 104 extends into slot 103 formed in frame element 21.

In order to rotate container 32 between its loading position as shown in FIGS. 3 and 4, and its dumping position as shown in FIG. 7 through its conveying and scattering position as shown in FIGS. 5 and 6, by selective actuation of piston rod 65, the cabling arrangement now to be described is provided. Referring particularly to FIG. 14, a first cable 72 shown in solid lines, is provided having one end 73 secured to an anchor 74 on cylinder 59. Cable 72 extends from anchor 74 rearwardly to and partially around sheave 69, forwardly to and partially around sheave 75 rotatably mounted on connecting element 20 of frame 17, rearwardly to and partially around sheave 76 likewise rotatably mounted on connecting element 20, rearwardly to and partially around sheave 58 on container 32, forwardly to and partially around sheave 77 rotatably mounted on transverse frame element 26, transversely to and partially around sheave 78 likewise rotatably mounted on connecting element 26, forwardly to and partially around sheave 68 of the sheave assembly 67, and rearwardly to its other end 79 secured to anchor 80 which in turn is secured to support 82 for gear box 83.

The drive for sheave 57 on the other side of container 32 is substantially identical and is provided by cable 84, shown in dashed lines in FIG. 14. Cable 84 has one end 85 secured to anchor 86 on cylinder 59, extends rearwardly to and partially around sheave 70 of sheave assembly 67, forwardly to and partially around sheave 87 rotatably mounted on connecting element 20 of frame 17, rearwardly to and partially around sheave 88 also rotatably mounted on connecting element 20, rearwardly to and partially around sheave 57 secured to container 32, forwardly to and partially around sheave 89 rotatably mounted on transverse frame element 26, transversely to and partially around sheave 90, also mounted on transverse frame element 26, forwardly to and partially around sheave 71 of sheave assembly 67, and rearwardly therefrom to its other end 92 secured to anchor 93, which in turn is secured to support 82 for the gear box 83.

Cables 72, 84 are respectively clamped to sheaves 58, 57 as shown at 176 in FIG. 4, thereby preventing slipping of the cables on the sheaves and providing a positive drive for the container 32 in response to actuation of hydraulic cylinder 59.

Reference to FIG. 14 will now reveal that when the pistion rod 65 is actuated so as to extend the yoke 66 and the sheave assembly 67 rearwardly toward container 32, as shown by arrows 94, cables 72 and 84 will be pulled in the directions shown by the arrows 95, 96 thereby to rotate sheaves 57, 58 and in turn container 32 in the direction shown by the arrows 97. Actuation of piston rod 65 in the opposite direction 102 will rotate sheaves 57, 58 and container 32 in the opposite direction 129. It will be seen that this cabling arrangement provides a two-to-one liner motion amplification, i.e., a given linear movement of piston rod 65 results in twice the linear movement of cables 72, 74 for rotating sheaves 57, 58 and container 32, thus permitting the use of a hydraulic cylinder 59 having a stroke only one-half (½) the linear movement required for rotation of the container.

Referring particularly to FIGS. 5 and 13, hydraulic cylinder 59 is anchored at its forward end 148 to tongue 22 and anchors 74, 86 for cable ends 73, 85 are provided in the manner row to be described. A sleeve 149 is secured to end 148 of cylinder 59, as by welding, and a bar 150 extends therethrough and through openings in plates 152, 153 which are secured to tongue 22, as by welding, thus anchoring cylinder 59. Ratchets 154, 155 are respectively formed on sleeves 156, 157 which are respectively rotatably mounted on ends 158, 159 of bar 150. Sleeves 156, 157 are retained in position on the ends of rod 150 by suitable bolts 160. Cable ends 73, 85 are respectively wrapped around sleeves 156, 157 and are secured by eye bolts 162, 163, as shown. Dogs 164, 165 are respectively pivotally mounted on plates 152, 153 and cooperate with ratchets 154, 155 to provide for tightening cables 72, 84. Openings 166 may be formed in the ends of sleeves 156, 157 for insertion of a bar for turning the sleeves and ratchets thereby to tighten the cables.

Referring now particularly to FIGS. 3, 4 and 11, it will be seen that with the cabling arrangement described, and with the eccentric mounting of container 32 as described, when piston rod 65 of hydraulic cylinder 59 is actuated to its fully retracted position, container 32 is rotated by means of cables 72, 84 and sheaves 58, 57 to its loading or scooping position with opening 40 facing generally rearwardly and with the scoop portion 43 facing rearwardly and downwardly so that edge 37 of the side wall 33 is adjacent the ground. In this position, when the implement is moved rearwardly or backed in the direction 31 by the tractor 16, material in pile 98 on the ground to be loaded into container 32 is scooped by the scoop portion 43 into the body portion 42 through the opening 40. Tangs 99 may be provided projecting outwardly from edge 37 of scoop portion 43 of container 32 to facilitate picking up material from the ground and loading it into the container.

Thus, container 32 may be rotated to its loading position by actuation of piston rod 65, the implement backed into the pile 98 of the material to be loaded thereby scooping some of the material into the body portion 42, the container may then be partially rotated in direction 97 by actuation of piston rod 65 toward its protracted position thereby to cause the material picked up by the tanks 99 to fall into the body portion 42, and the container 32 may then again be lowered to the loading position, the implement again backed into the pile 98 of material and the process repeated until a sufficient quantity of material has been loaded into the body portion 42 of the container 32.

The piston rod 65 is then actuated to its intermediate position as shown in FIG. 5 thereby to rotate container 32 to its conveying and scattering position as shown in FIGS. 5, 6 and 11. It will be seen that in the conveying and scattering position of container 32, opening 40 faces generally upwardly and the scoop portion 43 faces generally upwardly and rearwardly. It will further be seen with particular reference to FIG. 6, that rotation of the container 32 to its conveying and scattering position causes the material previously scooped into the body portion 42 to be distributed around the flail elements 52, as indicated by the dashed line 100.

In order to provide for selective rotation of shaft 50 and the flails 52 thereby to scatter material in the container 32 outwardly through opening 40, a gear box 83 is provided mounted on the transverse frame element 26 by means of a support 82. Drive shaft 105 is connected to gear box 83 and extends forwardly over yoke 66, piston rod 65 and hydraulic cylinder 59; drive shaft 105 is encased in a suitable housing 106 which is supported above hydraulic cylinder 59 by means of a suitable bracket assembly 107. Drive shaft 105 is adapted to be removably coupled to the power take-off 108 of the tractor 16 by a conventional coupling 109.

As best seen in FIG. 8, end 110 of flail shaft 50 is rotatably journaled in end wall 35 of container 32 in any suitable manner, as by a suitable bearing 112, and it will be understood that the other end of shaft 50 is similarly journaled in the other end wall 34. Stub shaft 54 which is secured to upstanding frame element 25 by pillow block 56 and which rotatably supports end wall 35, is in the form of a sleeve in which drive shaft 113 is rotatably journaled; it will be seen that drive shaft 113 is coaxial with the axis of stub shafts 53, 54 and thus with the axis of rotation of the container 32. Drive shaft 113 extends through end wall 35 and has a suitable sprocket 114 on its end within container 32. Another suitable sprocket 115 is secured to flail shaft 50 within container 32 and sprockets 114, 115 are drivingly connected by means of a suitable chain 116. A suitable housing 117 is provided within container 32 secured to the interior surface of side wall 35 and enclosing sprockets 114, 115 and drive chain 116. Drive shaft 113 has another sprocket 118 secured on its end 119 outboard from upstanding frame element 25.

Gear box 83 couples drive shaft 105 to another drive shaft 120 which extends transversely toward frame element 19 and which has its outer end 122 supported above the transverse frame element 26 by means of a suitable bracket 123. Sprocket 124 is secured to end 122 of shaft 120 and is drivingly connected to sprocket 118 on drive shaft 113 by a suitable drive chain 125. A suitable housing 126 encloses sprockets 118, 124 and drive chain 125. It will now be seen that selective actuation of the power take-off of the tractor will cause rotation of drive shaft 105 which in turn through gear box 183 and drive shaft 120 will drive sprocket 124, drive chain 125, sprocket 118, drive shaft 113, and sprocket 114, drive chain 116 and sprocket 115 thus to rotate shaft 50 and flails 52, despite the eccentric mounting of shaft 50 with respect to the axis of rotation of container 32.

It will now be seen that after the container 32 has been loaded as above described, hydraulic cylinder 59 may be actuated so as to rotate container 32 in the direction shown by the arrows 97 to its conveying and scattering position as shown in FIGS. 5 and 6. It will be observed by particular reference to FIG. 11 that by virtue of the eccentric mounting of the container 32, side wall 33 is spaced from the ground by a greater distance in the conveying position of the container 32 than it was during the loading position. The implement may then be towed by the tractor 16 to the desired scattering location at which point the power take-off of the tractor may be actuated to cause rotation of flail shaft 50, load starting bar assemblies 144, 146, and 145, 147, and flails 52, as above described, in the direction shown by the arrow 127 in FIG. 6, thereby to scatter the material in the body portion 42 of the container 32 outwardly through opening 40 as the implement is moved in the forward direction 30, as shown at 166.

When the spreading operation has been completed, there may be a small quantity of the material remaining in the body portion 42 of container 32 which has not been scattered by the flails 52 or there may be instances in which it is desired to load material into container 32 and convey it to another location, and then unload it directly upon the ground other than by scattering. In order to unload material remaining in container 32 after a spreading operation or material which it is not desired to spread, hydraulic cylinder 59 may be actuated to rotate container 32 in the direction shown by arrow 97 to its third position as shown in FIGS. 7 and 11. It will be seen that in this position the loading and scattering opening 40 faces generally forwardly and downwardly whereas the unloading opening 44 and door 45 face downwardly toward the ground. It will further be observed that by virtue of the eccentricity of the axis of rotation of container 32, side wall 33, of which door 45 forms a part, is now sufficiently spaced from the ground to permit the door 45 to be opened and pivoted downwardly, as shown by arrow 128 in FIG. 7. Thus, when the container 32 has been rotated to its unloading position as shown in FIGS. 7 and 10, pins 48 may be removed from latches 47 thus permitting door 45 to be pivoted downwardly under its own weight thereby to unload any remaining material in the container 32 directly onto the ground. It will be seen that material unloaded through opening 44 may be spread upon the ground in a belt of desired thickness by forward motion of the implement at the appropriate speed. It will also be seen that the rate of unloading can be controlled by the amount of opening of door 45. When this unloading operation is completed, hydraulic cylinder 49 may be actuated to rotate container 32 in the opposite direction 129 back to the conveying position as shown in FIGS. 5 and 6, or completely to the loading position as shown in FIG. 4, as desired, door 45 swinging back to its position closing opening 44 under its own weight as the container 32 is so rotated. Pins 48 are then again inserted in latches 47 so as to retain door 45 in its closed position.

Referring now to FIGS. 15 and 16 in which like elements are indicated by like reference numerals, there is shown the preferred form of load starting device employed in lieu of the load starting assemblies 144, 146 and 145, 147 of the previous figures. Here, a single load starting assembly 129 is provided secured to flail shaft 50 intermediate its ends. Load starting assembly 129 comprises a generally flat disc 130 concentrically secured to shaft 50, as by welding. Portions 132, four (4) of which are shown in FIG. 15, are bent transversely from the disc 130 adjacent its outer periphery and equally spaced therearound, portions 132 being bent in alternate directions and tapering smoothly to disc 130 in the direction of its rotation 127, as shown. Chain flail elements 133 are attached to the trailing edges 134 of the bent portions 132 and normally depend therefrom. Relatively short transversely extending blade elements 135 are also secured to the opposite faces of disc 130 and to shaft 50.

It will be seen that the load starting assembly 129 contributes much less vibration to the implement than the load starting assemblies of the previous figures and that while only one such assembly 129 has been shown and has been found completely adequate to start the load for scattering, additional assemblies 129 may be secured on shaft 50 as required. It will be seen that the blade configuration of disc portions 132 reduces the power required to start the load, and also, by virtue of their bending in alternate transverse directions, serve to spread the scattering pattern. Blades 135 serve not only to support the disc 130, but also as an impeller to throw the load outwardly from the center thus materially assisting in starting the load.

Referring now specifically to FIGS. 16 and 17, in the embodiment of the previous figures, a part of the drive for the flail shaft 50 was located in the interior of container 32, i.e., sprockets 114, 115 and chain 116. It may, however, be desirable to locate all the drive for flail shaft 50 exteriorally of the container 32. Here, stub shaft 166 has end wall 35 of container 32 rotatably journaled thereon by means of bearing 61, and is secured against rotation by pillow block 167 on upstanding frame support 168. The outboard end 169 of stub shaft 166 has a double sprocket 170 thereon. Flail shaft 50 is journaled in end wall 35 in a suitable bearing 172 and has sprocket 173 secured on its outboard end 174. Drive chain 116 interconnects sprocket 173 and one sprocket element of double sprocket 170, drive chain 125 being connected to the other element of double sprocket 173. Housing 175 encloses drive chains 116 and 125.

Referring particularly to FIG. 17, with the outboard location of the drive for flail shaft 50 above-described, generally L-shaped container-supporting elements 168 are provided in order to provide clearance for the outboard end 174 of flail shaft 50 when the container 32 is rotated to its loading position, as shown in FIG. 17. It will be seen that the outboard flail drive shown in FIGS. 16 and 17 permits the construction of a slightly narrower implement having the same width of container, and further provides an implement which can be operated closer to a wall or fence.

Referring briefly to FIG. 12, in both embodiments of the invention, sheaves 57, 58 preferably comprise an annular disc portion 137 abutting the respective end wall 34, 35 and secured thereto, as by welding, an axially extending flange portion 138 and an outer radially extending flange portion 139 which, with the respective end wall 34, 35 defines an annular groove 141 for receiving the respective cable 72, 84. In order to provide for self-cleaning of groove 141 by the cables 72, 84, a plurality of elongated openings 142 are preferably formed in flange 138, as shown.

While my improved self-loading material conveying and scattering implement has been illustrated and described as embodying a drive for the flail shaft powered by the power take-off of the towing tractor, it will be readily apparent that the flail shaft may be connected to the wheels of the implement and driven thereby in response to movement of the implement over the ground.

It will now be seen that I have provided a self-loading material conveying and scattering implement, particularly suited for use as a manure spreader, which by virtue of its self-loading feature, eliminates the need for auxiliary loading apparatus and/or special loading installations. It will further be seen that by virtue of the unloading feature, unscattered material may be unloaded where desired, and further that the implement may be employed for conveying material from one location to another at which it is unloaded without scattering. The implement of my invention has been found to be suitable for loading, conveying and scattering manure of all consistencies from primarily liquid to highly solid, including that having a high straw content. It will also be seen that the implement is simply and ruggedly constructed and easily maintained, thus lending itself admirably to farm use.

While I have illustrated and described a specific embodiment of my invention, further modifications and improvements will occur to those skilled in the art and I desired therefore in the appended claims to cover all modifications which do not depart from the spirit and scope of my invention.

What is claimed is:

1. A self-loading material conveying and scattering implement comprising: frame means including wheels for supporting said frame means upon the ground for movement in forward and reverse directions; a material container having side wall means joined to opposite end walls, said side wall means having spaced edges and said end walls having edges mutually defining an opening in the side of said container, said container having a body portion generally semi-circular in cross-section; a first shaft rotatably journaled in said end walls and extending across said body portion on a first axis adjacent the major axis thereof; means secured to said shaft in said container for scattering material contained therein outwardly through said opening in response to rotation of said shaft; means respectively rotatably mounting said end walls on said frame means on a second axis transverse to said direction of movement and eccentric with respect to said first axis thereby mounting said container for rotation between a first position with said opening facing generally rearwardly and with one of said side wall means edges adjacent the ground thereby to act as a scoop for loading material through said opening into said container when said implement is moved rearwardly, and to a second position with said opening facing generally upwardly thereby to distribute scooped material around said scattering means and to convey said material in said container; sheave means respectively secured to the outer sides of said side walls and coaxial with said second axis; double acting hydraulic cylinder means mounted on said frame means forwardly of said container and selectively actuable between first and second positions; cabling connecting said sheave means and said hydraulic cylinder means for rotating said container between said first and second positions thereof in response to actuation of said hydraulic cylinder means between said first and second positions thereof; drive shaft means coaxial with said second axis; first drive means connecting said first shaft and said drive shaft means; and second drive means mounted on said frame means forwardly of said container and connected to said drive shaft means for selectively rotating the same and said first shaft whereby material in said container in said second position thereof may be scattered through said opening during movement of said implement in said forward direction.

2. A self-loading material conveying and scattering implement adapted to be towed by a tractor of the type having a hydraulic system and a power take-off, said implement comprising: a frame comprising a generally U-shaped section having transversely spaced parallel leg elements joined by a forward connecting element, a tongue member extending forwardly from said connecting element and having means for removably connecting the same to said tractor, and a pair of upstanding elements respectively extending upwardly from said leg elements adjacent their rear ends; wheels respectively rotatably mounted on said leg elements for supporting said frame upon the ground for movement in forward and reverse directions; a container comprising a body portion formed of a side wall joined to opposite end walls, said side wall having a first opening therein extending substantially between said end walls, a scoop portion joined to said side and end walls and communicating with said first opening, said side wall having a second opening therein extending substantially between said end walls adjacent said first opening and remote from said scoop portion, a door member pivotally mounted on said end wall and normally closing said second opening, and latching means for holding said door member in its closed position; a first shaft having its ends rotatably journaled in said end walls and extending across said body portion on a first axis adjacent the major axis thereof; a plurality of flail elements secured to said first shaft in said body portion at spaced intervals therealong and normally hanging downwardly therefrom; means respectively rotatably mounting said end walls on said upstanding elements on a second axis eccentric with respect to said first axis thereby mounting said container between said leg and upstanding elements of said frame for rotation between a first position with said first opening facing generally rearwardly and with said scoop portion extending generally downwardly and rearwardly adjacent the ground for loading material through said first opening into said container when said implement is moved rearwardly, a second position with said first opening facing generally upwardly and with said scoop portion extending generally upwardly and rearwardly thereby to distribute scooped material around said flail elements and to convey material in said container, and a third position with said first opening facing generally forwardly and said second opening facing generally downwardly, said door member when closed in said third position of said container being spaced from the ground whereby said door member may be opened to unload material in said container through said second opening directly onto the ground, said door member pivoting downwardly under its own weight thereby to open said second opening when said container is in said third position; first sheave means respectively secured to the outer sides of said end walls and coaxial with said second axis; double acting hydraulic cylinder means mounted on said tongue member including means for removably coupling the same to the hydraulic system of said tractor and a piston rod extending toward said container and selectively actuable between protracted and retracted positions through an intermediate position; second sheave means carried by said piston rod; cabling connecting said first and second sheave means for rotating said container between said first and third positions of said container in response to actuation of said piston rod between said positions thereof; drive shaft means coaxial with said second axis; drive means respectively connecting said drive shaft means with said first shaft adjacent one end thereof; gear means mounted on said connecting element of said frame and including means for removably connecting the same to the power take-off of said tractor; and drive means respectively connecting said gear means to said drive shaft means for selectively rotating the same and said first shaft whereby material in said container in said second position thereof may be scattered through said first opening by said flail elements during movement of said implement in said forward direction.

3. A self-loading material conveying and scattering implement comprising: frame means including wheels for supporting said frame means upon the ground for movement in forward and reverse directions; a material container having sidewall means joined to opposite end walls, said side wall means having spaced edges and said end walls having edges mutually defining an opening in the side of said container, said container having a body portion generally semi-circular in cross-section; a first shaft rotatably journaled in said end walls and extending across said body portion on a first axis adjacent the major axis thereof; means secured to said shaft in said container for scattering material contained therein outwardly through said opening in response to rotation of said shaft; means respectively rotatably mounting said end walls on said frame means on a second axis transverse to said direction of movement and eccentric with respect to said first axis thereby mounting said container for rotation between a first position with said opening facing generally rearwardly and with one of said side wall means edges adjacent the ground thereby to act as a scoop for loading material through said opening into said container when said implement is moved rearwardly, and to a second position with said opening facing generally upwardly thereby to distribute scooped material around said scattering means and to convey said material in said container; a first sheave secured to the outer side of one of said end walls and coaxial with said second axis; double acting hydraulic cylinder means mounted on said frame means forwardly of said container and including a piston rod extending toward said container and selectively actuable between retracted and protracted positions; second and third sheaves carried by said piston rod; a cable having opposite ends with one end secured forwardly of said second and third sheaves and its other end secured rearwardly thereof said cable extending rearwardly from said one end partially around said second sheave to and partially around said first sheave, forwardly to and partially around said third sheave, and rearwardly to said other end thereof thereby rotating said container between said first and second positions thereof in response to actuation of said piston rod between said positions thereof; and means for selectively rotating said first shaft whereby material in said container in said second position thereof may be scattered through said opening during movement of said implement in said forward direction.

4. In a flail assembly for a material conveying and scattering implement including a rotatable shaft and a plurality of flail elements secured thereto at spaced intervals, a load starting device comprising a generally flat disc element concentrically secured to said shaft, said disc element having a plurality of blade elements adjacent its outer periphery and evenly spaced therearound, said blade elements having leading edges merging with said disc element and trailing edges extending in alternate transverse directions with respect to the plane of said disc element, and a plurality of flail elements respectively secured to said trailing edges of said blade elements and normally hanging downwardly therefrom.

5. The device of claim 4 further comprising impeller means respectively secured to opposite sides of said disc element and extending outwardly from said shaft.

6. A self-loading material conveying and scattering implement comprising: frame means including wheels for supporting said frame means upon the ground for movement in forward and reverse directions; a material container transversely disposed with respect to said direction of movement and having a side wall joined to opposite end walls, said side wall having transversely extending opposite edges, said end walls and said side wall edges mutually defining a first transversely extending opening in said container, said side wall having a generally part-cylindrical material-containing portion intermediate said opposite edges facing said opening and having a transversely extending major axis, said side wall having a scoop portion extending between one of said edges and said material-containing portion, said side wall having a second transversely extending opening formed therein generally opposite from said scoop portion; door means pivotally mounted on said container and normally closing said second opening; means in said container mounted on said end walls for rotation about a transversely extending axis adjacent said major axis for scattering material contained therein outwardly through said first opening; means respectively rotatably mounting said end walls on said frame means on a second axis passing transversely through said material-containing portion parallel and eccentric with respect to said major axis thereby mounting said container for rotation about said second axis, said second axis being positioned with respect to said major axis so that said container has a first rotational position with said first opening facing generally rearwardly and with said scoop portion adjacent the ground for loading material through said first opening when said implement is moved rearwardly, a second rotational position with said first opening facing generally upwardly and said material-containing portion spaced from the ground thereby to distribute scooped material around said scattering means and to convey said material in said material-containing portion, and a third rotational position with said door means spaced from the ground and facing generally downwardly whereby said door means may be opened to unload material from said container through said second opening onto the ground; means for selectively rotating said container between said position thereof; and means for selectively rotating said scattering means whereby material in said container in said second position thereof may be scattered through said first opening during movement of said implement in said forward direction.

7. A self-loading material conveying and scattering implement comprising: a main frame having transversely spaced longitudinally extending side elements; a pair of wheels respectively mounted on said side frame elements on an axis transverse with respect thereto for supporting said frame upon the ground for movement in forward and reverse directions, said wheels being respectively disposed outwardly of said frame elements; a pair of upstanding supports respectively mounted on said frame elements and spaced apart transversely of the direction of said movement; a part-cylindrical material container having a side wall joined to spaced, parallel opposite end walls, said end walls and side wall mutually defining an opening communicating with the interior of said container, said container having a major axis extending longitudinally through said end walls, scoop means joined to said side wall at one side of said opening; a shaft rotatably journaled in said end walls and extending longitudinally through said container on a first axis adjacent said major axis; a plurality of flail elements secured to said shaft in said container at spaced intervals therealong and normally hanging downwardly therefrom; means respectively rotatably mounting said end walls on said supports on a second axis extending longitudinally through said end walls and container parallel and eccentric with respect to said major axis, said container being transversely disposed between said supports, said side frame elements and said wheels, said second axis being positioned with respect to said first axis so that said container has a first rotational position with said opening facing generally rearwardly and with said scoop means inclined downwardly and rearwardly adjacent the ground for loading material through said opening into said container when said implement is moved rearwardly, and a second rotational position with said opening facing generally upwardly and said side wall spaced from the ground thereby to distribute scoop material around said flail elements and to convey said material in said container; means for selectively rotating said container between said first and second positions thereof; and means for selectively rotating said shaft whereby said flail elements scatter said material contained in said container in said second position thereof outwardly through said opening during movement of said implement in said forward direction; said axis of said wheels extending longitudinally through said end walls and said container when in said first position thereof.

8. The apparatus of claim 7 further comprising load starting means on said shaft in said container, said load starting means comprising a rigid element secured to said shaft and extending radially outwardly therefrom, and at least one flail element secured to said rigid element at a point thereon spaced from said shaft.

9. The apparatus of claim 7 further comprising load starting devices on said shaft in said container respectively adjacent said end walls, each of said devices comprising a bar element rigidly secured to said shaft and extending radially outwardly therefrom, and a flail element secured to the outer end of said bar element, said bar elements respectively extending in opposite directions.

10. A self-loading material conveying and scattering implement comprising: frame means including wheels for supporting said frame means upon the ground for movement in forward and reverse directions; a material container having side wall means joined to opposite end walls, said side wall means having spaced edges and said end walls having edges mutually defining an opening in the side of said container; a shaft rotatably journaled in said end walls and extending across said container; a plurality of flail elements secured to said shaft in said container at spaced intervals therealong and normally hanging downwardly therefrom; means respectively rotatably mounting said end walls on said frame means on an axis transverse to said direction of movement thereby mounting said container for rotation between a first position with said opening facing generally rearwardly and with one of said side wall means edges adjacent the ground thereby to act as a scoop for loading material through said opening into said container when said implement is moved rearwardly, and a second position with said opening facing generally upwardly thereby to distribute scooped material around said flail elements and to convey material in said container; means for selectively rotating said container between said first and second positions thereof; means for selectively rotating said shaft whereby said flail elements scatter said material contained in said container in said second position thereof outwardly through said opening during movement of said implement in said forward direction; and load starting means on said shaft in said container, said load starting means comprising a generally flat disc element concentrically secured to said shaft, said disc element having a plurality of blade elements adjacent its outer periphery and evenly spaced therearound, said blade elements having leading edges merging with said disc element and trailing edges extending in alternate transverse directions with respect to the plane of said disc element, and a plurality of flail elements respectively secured to said trailing edges of said blade elements and normally hanging downwardly therefrom.

11. The apparatus of claim 10 wherein said load starting means further comprises impeller means respectively on the opposite sides of said disc element and extending outwardly from said shaft.

References Cited by the Examiner

UNITED STATES PATENTS

| | | | |
|---|---|---|---|
| 1,463,492 | 7/23 | Varland | 275—1 |
| 2,254,690 | 9/41 | Love | 275—1 |
| 2,419,262 | 4/47 | Gurries et al. | 275—216 |
| 2,952,465 | 9/60 | Skromme | 275—3 |
| 3,011,793 | 12/61 | McElhinney et al. | |
| 3,048,409 | 8/62 | Elwick | 172—45 X |

ABRAHAM G. STONE, *Primary Examiner.*

WILLIAM A. SMITH, III, *Examiner.*